United States Patent [19]
Shoemaker

[11] Patent Number: 5,870,851
[45] Date of Patent: Feb. 16, 1999

[54] FLEA REMOVAL ASSEMBLY AND CONVERSION KIT

[76] Inventor: David G. Shoemaker, 620 Lake Osborne Ter., Lake Worth, Fla. 33461

[21] Appl. No.: 866,767

[22] Filed: May 30, 1997

[51] Int. Cl.[6] .............................. A01M 1/14; A01M 1/06; A47L 5/24; A01K 13/00
[52] U.S. Cl. ................................ 43/114; 43/136; 43/139; 15/344; 15/402; 119/626
[58] Field of Search ........................... 15/344, 397, 402; 43/107, 114, 136, 139, 140; 119/606, 626, 625

[56] References Cited

U.S. PATENT DOCUMENTS

| | | |
|---|---|---|
| D. 272,568 | 2/1984 | Kuhl . |
| D. 307,067 | 4/1990 | Kuhl et al. . |
| D. 326,744 | 6/1992 | LeClair . |
| D. 368,342 | 3/1996 | Founds . |
| 1,107,537 | 8/1914 | McCann . |
| 1,255,601 | 2/1918 | Hare . |
| 3,626,546 | 12/1971 | Dove . |
| 3,955,238 | 5/1976 | Remijas . |
| 4,190,924 | 3/1980 | Nicholson . |
| 4,279,095 | 7/1981 | Aasen ........................................ 43/139 |
| 4,380,845 | 4/1983 | Miller ........................................ 15/344 |
| 4,485,583 | 12/1984 | Planty ....................................... 43/139 |
| 4,488,331 | 12/1984 | Ward ......................................... 43/136 |
| 4,599,823 | 7/1986 | Lee . |
| 4,630,329 | 12/1986 | Shores ....................................... 15/368 |
| 4,729,147 | 3/1988 | Armbruster . |
| 4,815,232 | 3/1989 | Rawski . |
| 4,817,330 | 4/1989 | Fahringer ................................... 43/136 |
| 4,967,443 | 11/1990 | Krasznai et al. . |
| 5,052,147 | 10/1991 | Broomfield ................................ 43/139 |
| 5,072,746 | 12/1991 | Kantor . |
| 5,095,853 | 3/1992 | Kruger . |
| 5,099,545 | 3/1992 | Krasznai et al. . |
| 5,155,765 | 10/1992 | El . |
| 5,207,183 | 5/1993 | Praschnik et al. . |
| 5,211,131 | 5/1993 | Plyler . |
| 5,502,873 | 4/1996 | Hogan . |

*Primary Examiner*—Jack W. Lavinder
*Attorney, Agent, or Firm*—Neil F. Markva

[57] ABSTRACT

The assembly of the invention comprises a comb externally disposed at one end of a housing member adjacent an air inlet opening for separating fleas from the outer skin of an animal. A specific embodiment comprises a retrofit kit combination for converting a hand-held battery-powered vacuum cleaner into a flea removal assembly. A comb assembly has a structural configuration effective to fit in registered alignment with the air inlet opening of the vacuum cleaner for separating fleas from the outer skin of an animal. The comb may be coupled in a fixed manner or be removably secured to the outer distal end of the housing member adjacent the air inlet opening. A flea disposal module is effective to entrap fleas separated from the outer skin of an animal with the comb and subsequently carried into the air inlet opening of the housing member when the suction providing mechanism of the vacuum cleaner operates to produce a current of air flowing into the air inlet opening, through the housing member, and out of the air outlet opening of the housing member.

24 Claims, 8 Drawing Sheets

FLEA REMOVAL ASSEMBLY AND CONVERSION KIT

FIELD OF THE INVENTION

This invention relates to removing fleas, larvae, pupae, and eggs primarily from the outer skin or hair of an animal and from rugs, mats, fabrics, coats and other items to which fleas might attach. More specifically, the invention relates to converting an existing hand-held vacuum cleaner to a flea removal apparatus.

BACKGROUND OF THE INVENTION

Fleas are known disease carriers for both the bubonic and pneumonic plagues. The spreading of a plague by fleas transmitting disease from animals such as rodents to human beings has much potential in the United States. It is particularly problematic in third-world countries where the standard of living is extremely low and living conditions are ripe for transmitting such disease from animals to human beings. Therefore, removing fleas from domestic animals is more than just removing an irritation.

A May 1988, National Geographic article "Fleas: The Lethal Leapers" reports that various species of fleas can jump 150 times their own length vertically or horizontally; survive months without feeding; accelerate 50 times faster then the space shuttle; withstand enormous pressure; and remain frozen for a year and then revive. With this understanding, the need for a device such as disclosed here is significantly magnified.

The possibility of these plagues and the U.S. banning of DDT used in the past to kill the bacteria causing these diseases make it significantly important to entrap and/or kill fleas on an animal while protecting the caretaker of the animal.

PRIOR ART

Numerous patents are directed to different types of devices useful in removing fleas from an animal's skin. U.S. Pat. Nos. 3,626,546; 4,279,095; 4,630,329; and 5,095,853 show different types of combing devices designed as attachments to an existing vacuum producing device to capture fleas found on an animal.

Each of the U.S. Pat. Nos. 4,485,583; 5,115,765; and 5,211,131 discloses a completely self-sufficient hand-operated pest vacuum/suction device in combination with combing means and an insect entrapment apparatus.

The pet grooming device of U.S. Pat. No. 5,211,131 includes a material collection chamber having a flexible, air pervious bag member for collecting fleas and related debris that are separated by combing means disposed adjacent the chamber air inlet. External air is sucked into the air inlet and out of the collection chamber through a discharge opening attached to a suction-producing device.

U.S. Pat. No. 5,115,765 states that a battery-operated vacuum is not strong enough to extract fleas from pets and consequently discloses a device that includes a self-contained blower and vacuum unit used in combination with a disposal bag housing. Contrary to this prior art observation, however, the invention disclosed herein is capable of using a battery-powered vacuum that includes a unique flea disposal unit located in a material collection chamber connected to a suction-producing mechanism.

U.S. Pat. No. 4,815,232 discloses a hand-held comb that includes an adhesive portion for capturing fleas. The usefulness of this known structure is limited, however, because the flea can jump vertically or horizontally to avoid being caught permanently. Because the fleas, pupae, larvae, and eggs must find their way to the adhesive located in the recesses of the comb structure, they may never attach to the adhesive material. Each time this known device is placed on the coat of the animal, any flea, larvae, pupae, or eggs not in contact with the adhesive material could return to the host animal or even jump to the skin of the caretaker.

The attachment device for a suction cleaning machine of U.S. Pat. No. 4,488,331 includes a disposable bag having an interior adhesive portion for capturing insects.

U.S. Pat. Nos. 1,107,537; 1,255,601; 4,279,095; 4,599,823; and 4,630,329 disclose comb devices for bringing the fleas into contact with an insecticide to effect their death. U.S. Pat. No. 1,255,601 uses hot water as the insecticide and the devices of U.S. Pat. Nos. 4,279,095 and 4,630,329 include a vacuum-producing mechanism operating with the comb device to draw the insects in contact with an insecticide-treated vacuum bag.

U.S. Pat. No. 5,207,183 discloses a flea disposal apparatus that uses a Velcro belt to pick up pests from an animal and mechanically deposit them into a container without using chemicals or a vacuum suction device.

U.S. Pat. No. 5,072,746 discloses a hair grooming comb device having electrically conductive tines for electrocuting pests found in the hair.

U.S. Design Pat. Nos. 272,568; 307,067; 326,744; and 368,342 disclose different ornamental designs for vacuum cleaners designed for small animals and pets.

U.S. Pat. Nos. 3,955,238; 4,190,924; 4,729,147; and 5,502,873 show various types of attachments to a vacuum source for debris loosening, pet grooming, and flea removing from animals.

None of the known devices disclose how an existing hand-held vacuum cleaning may be converted for use in pet grooming and flea removing.

PURPOSE OF THE INVENTION

The primary object of the invention is to provide a flea removal system including a vacuum or suction producing mechanism and an adhesive carrier system for trapping fleas separated from an animal's coat with an associated combing apparatus.

Another object of the invention is to provide a unique adhesive carrier means to adhesively capture separated fleas upon contact within a material collection chamber connected to an air flow producing mechanism that effects a suction for separating the fleas from an animal's coat.

A further object is to provide a self-sufficient battery-powered vacuum cleaner for entrapping fleas separated from an animal's coat thus producing results contrary to the findings of the prior art.

A still further object of the invention is to convert a known hand-held vacuum cleaner to a flea removal apparatus with an adhesive flea disposal unit located within the vacuum cleaner material collection housing.

Another object of the invention is to provide a retrofit kit combination for converting an existing hand-held vacuum cleaning device to a manually operated suction device for removing fleas and other related matter from an animal's coat and drawing a current of air through and carrying the fleas and related matter into a material collection chamber.

A still further object is to provide a retrofit comb assembly for a hand-held vacuum cleaner to remove fleas from the outer skin of animals while protecting an animal caretaker from becoming a host for a separated flea.

SUMMARY OF THE INVENTION

The invention is directed to an assembly comprising air current producing means, housing means, comb means, flea disposal means, and connecting means for removably attaching the housing means to the air current producing means. The housing means defines a material collection chamber having air inlet means at one end thereof and air outlet means at the other end thereof. The comb means is externally disposed on one end of the housing means adjacent to and registered with the air inlet means for separating fleas from the outer skin of an animal. The flea disposal means is removably mounted at the other end of the housing means for entrapping fleas within the housing means thus preventing fleas from escaping and reinfecting an animal. The term "fleas" is used in the specification to refer collectively to fleas, pupae, larvae, and/or eggs.

The flea disposal means of the invention includes adhesive surface carrier means mounted to base means for disposition within the housing means. And the adhesive surface carrier means includes adhesive surface portions to adhesively capture separated fleas upon contact within the housing means. The base means is removably disposed adjacent to and across the air outlet means and air pervious means allows a current of air to flow therethrough and outwardly from the air outlet means. Connecting means removably attaches the housing means to the air current producing means for drawing external air through the air inlet means into the material collection chamber through the air pervious means and out of the air outlet means.

In a specific embodiment, the adhesive surface carrier means comprises a flea disposal module including disposable material that includes adhesive surface portions and is removably mounted to the base means. The base means may be composed of disposable material and includes connecting means for removably securing the flea disposal module comprising an adhesive surface carrier that projects into the material collection chamber when the connecting means secures the flea disposal module to the air current producing means. In this embodiment, the flea disposal module is disposable in its entirety. A kit combination of the invention may include at least one or a plurality of modules comprising the flea disposal means described herein.

A particular flea disposal module of the invention comprises an adhesive surface carrier that includes a base frame portion and a plurality of adhesive carrier elements each having adhesive surface portions. The adhesive carrier elements are composed of disposable material and supported by projection means extending outwardly from the base frame portion to support the adhesive carrier elements. In a specific embodiment, the disposable carrier elements are removably mounted to the projection means. The invention contemplates a plurality of carrier elements bound together in spaced relationship to each other to form a carrier element unit wherein slots or openings located in the individual carrier elements are in alignment so that the carrier element unit may be slidingly fit over the projection means.

The housing means of the invention includes a shape outlet opening and the base means of the flea disposal module includes a base frame portion having an air pervious section and an outer rim section shaped to frictionally fit within the shaped outlet opening of the housing means for directing the current of air to flow through the air pervious section. The air pervious section of the base frame portion includes air filter means to keep any separated fleas removed from the outer skin of an animal within the material collection chamber when directing the current of air through the housing means.

In a specific embodiment, the housing means comprises a housing member having a shaped inner surface defining a flea disposal chamber section within a material collection chamber and adjacent the shaped outlet opening of the housing member. The adhesive surface carrier is mounted to the base frame portion and includes a plurality of adhesive carrier elements laterally spaced with respect to each other. Each of the carrier elements has an outer profile shaped to substantially contiguously fit within the shaped inner surface of the flea disposal chamber section. Each of the adhesive carrier elements includes a plurality of apertures through which a current of air is directed to flow through the flea disposal chamber section when the flea disposal means is mounted within the air outlet means and a current of air is drawn through the housing member.

The apertures are sized in each succeeding adhesive carrier element to increase the velocity of air flow as the air moves through the flea disposal module of the invention is disposed within the flea disposal chamber section. Each of the adhesive carrier elements includes a nonadhesive peripheral edge portion to preclude adherence of the adhesive surface carrier to the shaped inner surface of the flea disposal chamber section.

Another feature of the invention comprises three adhesive carrier elements supported on projection means extending outwardly from the base frame portion. The adhesive carrier element spaced furthest from the base frame portion has the largest apertures for air flow. And each carrier element succeedingly closer to the base frame portion has proportionately smaller openings to successively increase the velocity of air flow passing through the flea disposal module. The apertures in each of the adhesive carrier elements are spaced with respect to each other to cause separated fleas to adhere when the air current changes directions from one carrier element to the next. In effect, the laterally spaced carrier elements form a labyrinth flow of air current that carries separated fleas that are misdirected when the air current changes direction and are thus thrown against and adhere to the adhesive surface portions. It is contemplated that the carrier elements may be fixedly secured to the base frame portion to form a completely disposable flea disposal module.

Another feature of the invention is directed to comb means including a comb member having a plurality of tines and being mounted to adjust the angle of disposition of the comb member with respect to the air inlet means of the housing means. In a specific embodiment, the comb coupling means includes a generally U-shaped bracket member having two opposed coupling end sections adjustably fastened to the housing means and an intermediate comb member carrying section adjustably fastened to the comb member.

A particular feature comprises a conversion kit combination for retrofitting a known hand-held vacuum cleaner such as the Dust Buster produced by Black and Decker to form a flea removal assembly. The known vacuum cleaner has a material collection housing member removably attached to hand-held air current providing means that produces the suction of the cleaner. The housing member has air inlet means at an outer distal end thereof, air outlet means at an inner end thereof, and air filter means disposed within the air outlet means to allow an air current to flow through the housing member while collecting vacuumed material within the material collection housing chamber.

The conversion kit comprises comb means including a tine portion and comb coupling means for securing the comb means to the outer distal end of the housing member to dispose the tine portion at an angular disposition to and in registered alignment with the air inlet means. Flea disposal means has a structural configuration effective to frictionally fit within the air discharge opening or air outlet means of the housing member in exchange for the air filter assembly of the vacuum cleaner. The flea disposal means is effective to entrap and kill fleas that are separated with the comb means from the outer skin of an animal and carried into the air inlet means of the housing member when a current of air flows through the housing member and flea disposal means and out of the air discharge opening.

In a specific embodiment, the flea disposal means includes baffle means for allowing a current of air carrying separated fleas to pass through the baffle means which includes adhesive surface portions to adhesively entrap the separated fleas upon contact. The baffle means includes a plurality of baffle members mounted to base frame means and are in spaced relationship with respect to each other to form an entrapment zone adjacent the housing member air outlet opening and within the air collection housing chamber. The baffle means has a structural configuration effective to increase the air velocity in the air flow moving towards the air discharge opening.

A further feature of the invention comprises comb coupling means that includes collar means having a structural configuration effective to fit over the outer distal end of the housing member to dispose flea separating comb means adjacent to and in registered alignment with the air inlet means. Fastening means maintain the collar means on the housing member. In a specific embodiment, the collar means includes elastomeric sleeve means for frictionally gripping the outer surface of the housing member to maintain the flea separating comb means adjacent the air inlet means. In another specific embodiment, the comb coupling means includes a generally U-shaped bracket member having two opposed coupling end sections adjustably fastened to the housing member and a comb means carrying section intermediate the two end sections with attachment means for adjusting the comb member with respect to the air inlet means.

The retrofit kit combination of the invention is used for converting a hand-held vacuum cleaner into a flea removal assembly. The vacuum cleaner includes a material collection housing member removably attached to a hand-held suction providing means wherein the housing member has air inlet means at an outer distal end thereof, air outlet means at an inner end thereof. And air filter means disposed within the air outlet means allows an air current to flow through the housing member while collecting material carried by the air current. The kit combination comprises comb means having a structural configuration effective to fit in registered alignment with the air inlet means of the vacuum cleaner for separating fleas from the outer skin of an animal. Comb coupling means secures the comb means to the outer distal end of the housing member adjacent to and in alignment with the inlet means. According to the invention, the comb means may be formed as an integral part of a nozzle member designed to slidingly fit into the air inlet means of a housing member or as a separate comb structure designed to be either adhesively secured to or removably disposed on the nozzle member during use of the vacuum cleaner as a flea disposal apparatus.

In a specific embodiment of the novel kit combination, a flea disposal module has a structural configuration effective to fit in registered frictional alignment with the outlet means of the housing member in place of the air filter means of the vacuum cleaner. The flea disposal module is effective to entrap fleas separated from the outer skin of an animal with the comb means when the suction providing means produces a current of air to flow into the air inlet means, through the housing member, and out of the air outlet means. Connecting means frictionally secures the flea disposal module to the suction providing means of the vacuum cleaner in exchange for its air filter means.

More specifically, the flea disposal module includes baffle means disposed on base frame means to form an entrapment zone adjacent the air inlet means within the material collection housing member. The baffle means includes air current flow control means for increasing the air velocity in a current of air that flows through the baffle means, which includes adhesive surface portions to entrap the separated fleas upon contact. In a specific embodiment, the comb coupling means includes collar means having a structural configuration effective for disposition over an outer distal end surface portion of the housing member to secure the flea separating comb means adjacent to and in registered alignment with the air inlet means of the vacuum cleaner.

In another embodiment, the air inlet means of the vacuum cleaner includes receiving means for frictionally mating with an insertion portion of a nozzle member that slidingly fits into the air inlet means of the vacuum cleaner housing member. The nozzle member includes an air inlet opening at a distal end thereof and the comb means of the invention is fixedly located at an angular disposition to and in registered alignment with the air inlet opening of the nozzle member. In a more specific embodiment of the kit combination of the invention, the comb means includes a comb member having mating surface means shaped to conform to an outer surface portion of the nozzle member. The comb coupling means includes adhesive means disposed between the mating surface means and the outer surface portion of the nozzle member for fixedly securing the comb means to the nozzle member.

In an alternate embodiment of the kit combination, the comb means includes a tine portion and mating surface portion shaped to conform to and mate with an outer surface portion of the nozzle member in a fixed location on the nozzle member. The comb coupling means includes elastomeric annular band means for removably resiliently maintaining the tine portion in the fixed location and in alignment with the air outlet opening of the nozzle member during use of the vacuum cleaner as a flea disposal assembly.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION OF THE INVENTION

Figure 1:
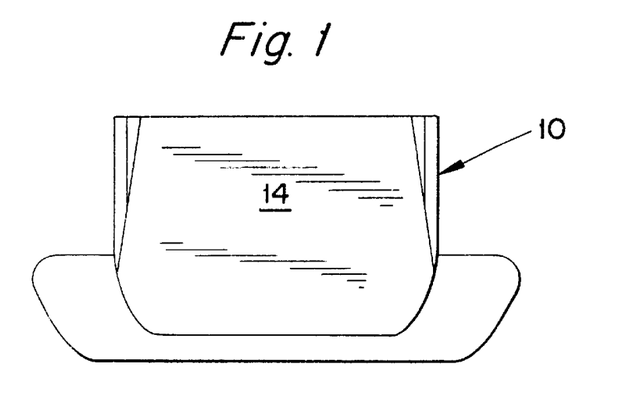
FIG. 1 is a top plan view of a nozzle brush attachment for a known hand-held vacuum cleaner with the brush removed.
Figure 2:
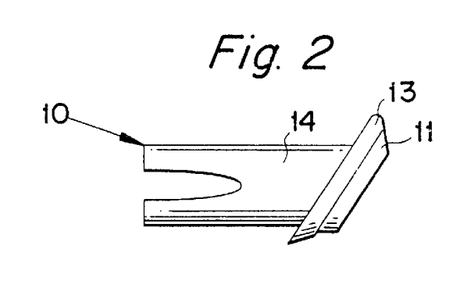
FIG. 2 is a side elevational view of the nozzle attachment of FIG. 1.
Figure 3:
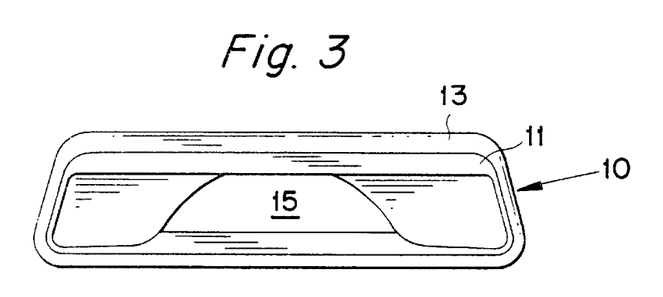
FIG. 3 is a front elevational view of the nozzle attachment of FIG. 1.
Figure 4:
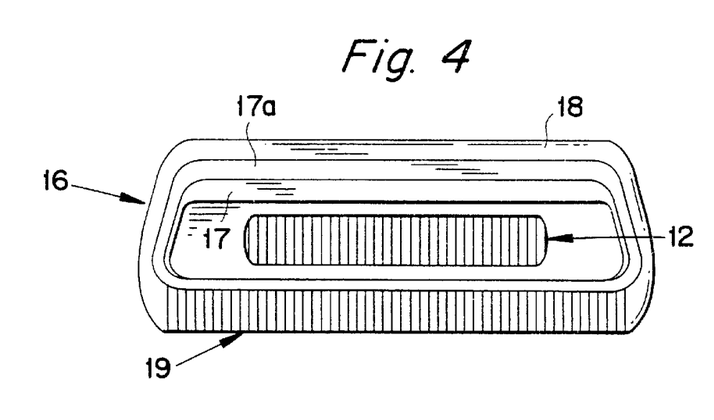
FIG. 4 is a rear elevational view of a comb attachment of the invention that fits the nozzle attachment shown in FIGS. 1–3.

A standard nozzle brush attachment for a hand-held battery-operated Black and Decker vacuum cleaner is shown in FIGS. 1, 2, and 3 with the brush portion of the nozzle 10 removed. Nozzle 10 includes an insert portion 14, an inner hub or face portion 11 and outer flange portion 13. The inner bore of nozzle 10 extends through insert portion 14 and has an inlet opening 15 that directs an air current produced by the suction means of the vacuum cleaner to flow from the face of nozzle 10 and into the collection chamber of the cleaning device. To convert the nozzle brush attachment, the brush portion is removed exposing a face configuration to which a comb attachment 16 may be secured. Comb attachment 16 includes a nozzle face mating surface having a mirror image that matches the face of nozzle 10. Comb attachment 16 is fixed to nozzle 10 by placing an adhesive along the surface of mating portions 17 and 17a which mate with respective face portions 11 and 13 of nozzle member 10. Comb attachment 16 includes tine portion 19 that extends outwardly from base section 18. Opening 12 in base section 18 directs the flow of air into nozzle 10 as tine portion 19 loosens fleas and other debris as it is drawn across the outer skin of the animal being groomed.

Figures 5, 6:
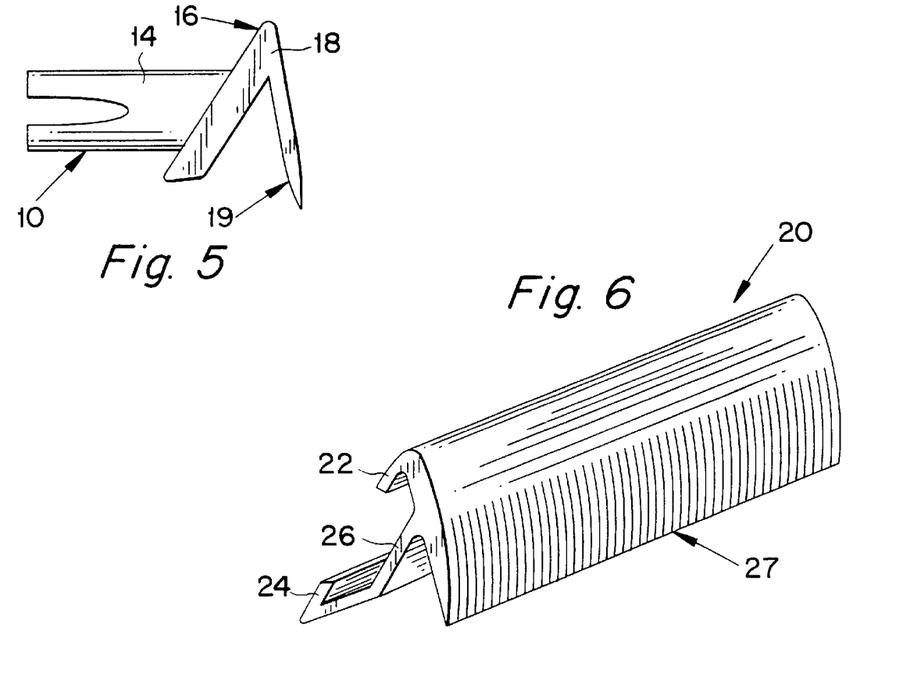
FIG. 5 is a side elevational view of the nozzle attachment of FIGS. 1–3 to which the comb attachment of FIG. 4 is secured.
FIG. 6 is a perspective view of another comb attachment embodiment of the invention.
Figure 7:
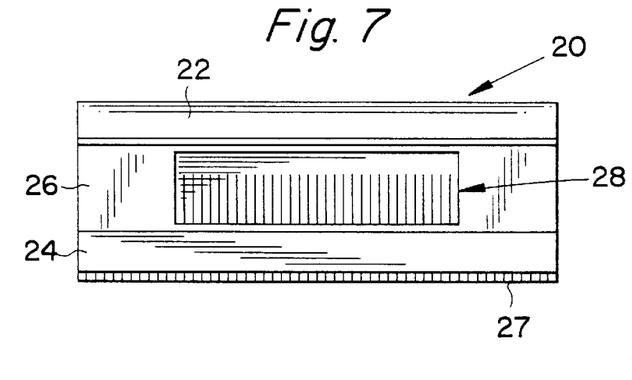
FIG. 7 is a rear elevational view of the comb attachment of FIG. 6.
Figure 8:
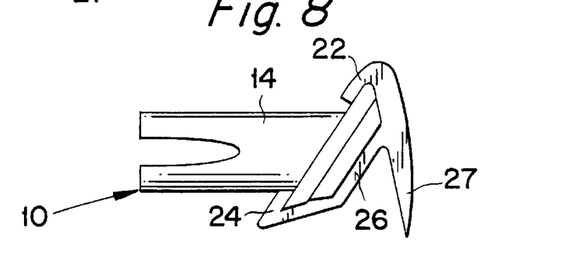
FIG. 8 is a side elevational view showing the comb attachment of FIG. 6 secured to the nozzle attachment of FIGS. 1–3.

A second embodiment of a comb assembly of the invention shown in FIGS. 6–8 includes comb attachment 20 having tine portion 27 and a structural configuration effective to either removably snap over or slide across the face of nozzle member 10. The structure must be rigid enough to hold the tine portion 27 once in place. Comb attachment 20 includes rear base portion 26 having opening 28 to draw air from behind tine portion 27 to sweep fleas and debris into nozzle 10. Comb assembly 20 includes an upper grasping portion 22 and a lower grasping portion 24 having either a structure which may snap over the upper and lower portions respectively of the nozzle 10 or a rigid structure that will slide onto nozzle 10 from one side thereof to the other until opening 28 is aligned with opening 15 of nozzle 10.

Figure 9:
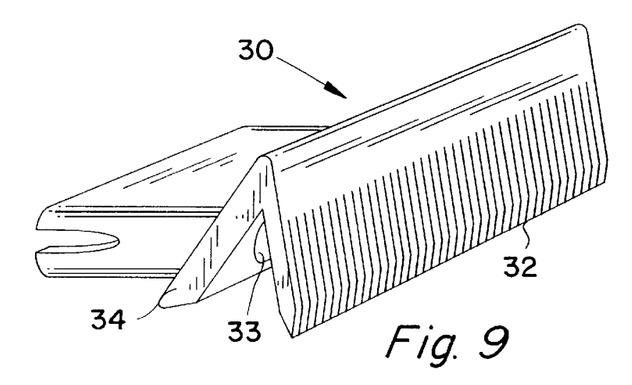
FIG. 9 is a perspective view of a unitary one-piece nozzle attachment having a comb section for use with a hand-held vacuum cleaning device.
Figure 10:
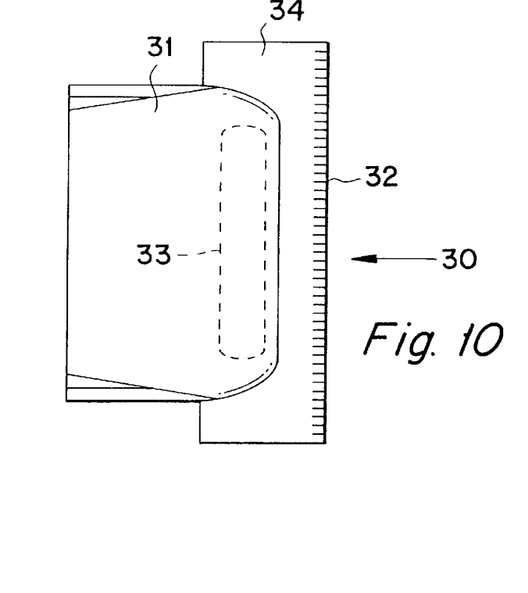
FIG. 10 is a top plan view of the nozzle attachment of FIG. 9.

Nozzle member 30 in FIGS. 9 and 10 that is a molded one-piece configuration having insert portion 31, tine portion 32, and base portion 34 having an opening 33 that draws air into the vacuum cleaner. Insert portion 31 has a structure configuration effective to slidingly fit to a collection chamber housing in a well known manner as described herein.

In each of the foregoing embodiments of the comb assemblies 16, 20, and 30, each respective tine portion has a length sufficient to maximize the power of the suction set by the air producing means of the vacuum source. The comb length is about 1 and ⅛ inch long giving a better control in grooming the outer skin of an animal while the nozzle is attached to any available vacuum cleaning device such as a Black and Decker Dustbuster, Hoover, Eureka or Dirt Devil device. Each of the comb assemblies 16, 20, and 30 has a coupling or connecting portion with a structural configuration effective to fit a tine portion into registered alignment with the air inlet of the vacuum cleaner for separating fleas from the outer skin of an animal. The tine portion may be made part of the flea separating comb assembly with either an adhesive as in the embodiment of FIGS. 4 and 5, or a mechanical structure such as in the embodiment of FIGS. 6–8, or in a one-piece configuration as in the embodiment of FIGS. 9 and 10.

Figure 11:
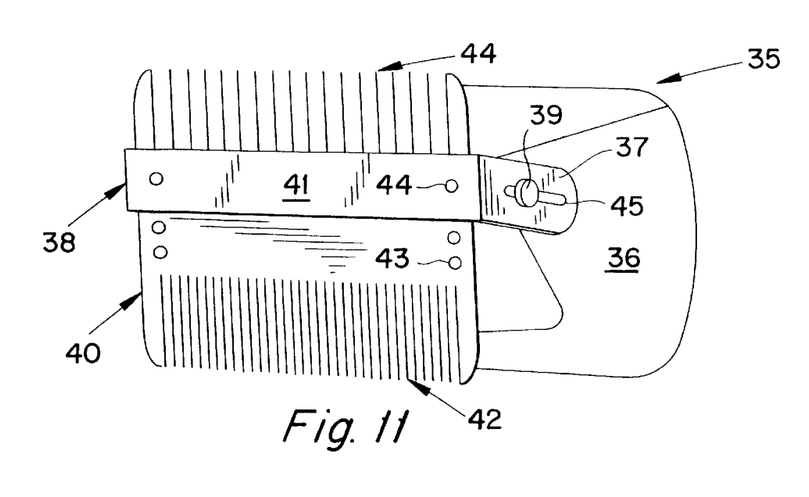
FIG. 11 is a perspective view of another embodiment of a comb attachment assembly for retrofitting a hand-held vacuum cleaner.
Figure 12:
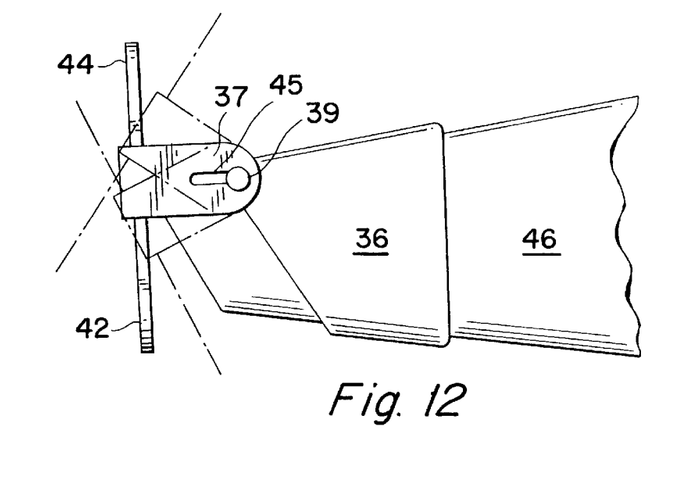
FIG. 12 is a side elevational view of the assembly of FIG. 11 disposed on the housing member of a hand-held vacuum cleaner.
Figures 20, 21, 22:
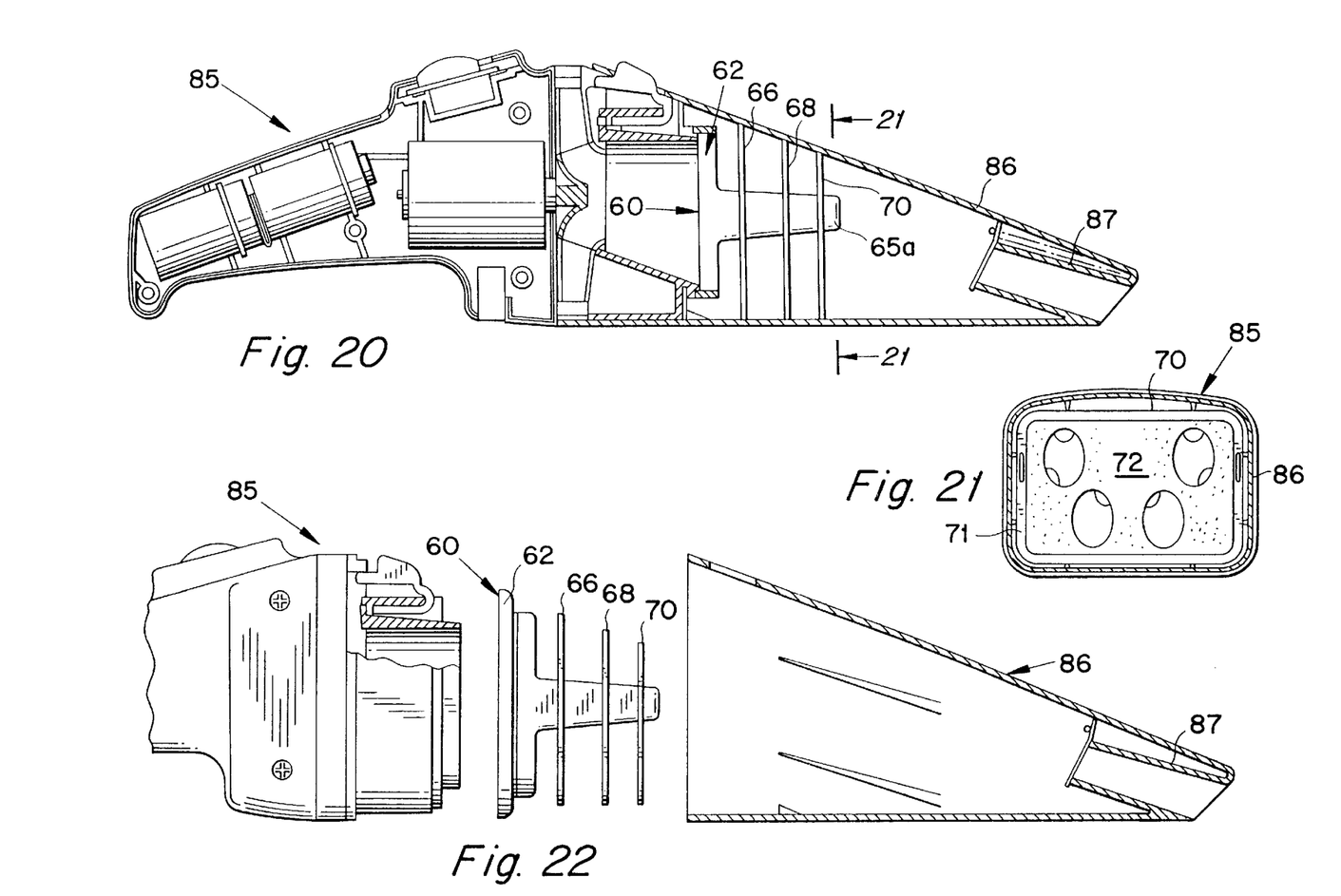
FIG. 20 is a sectional view of a known hand-held battery operated vacuum cleaner fitted with a flea disposal module of the invention.
FIG. 21 is a sectional view along line A—A of FIG. 20.
FIG. 22 is a fragmentary exploded view of the assembly shown in FIG. 20.
Figure 23:
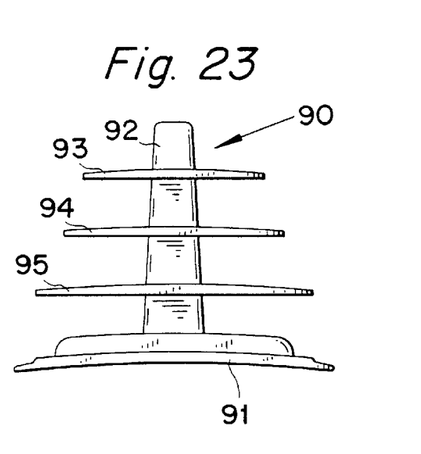
FIG. 23 is a side elevational view of another embodiment of a flea disposal module of the invention.
Figure 24:
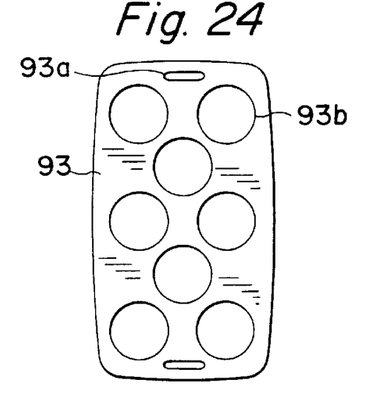
FIGS. 24, 25 and 26 are respective top plan views of the adhesive carrier elements for the embodiment of FIG. 23.
Figure 25:
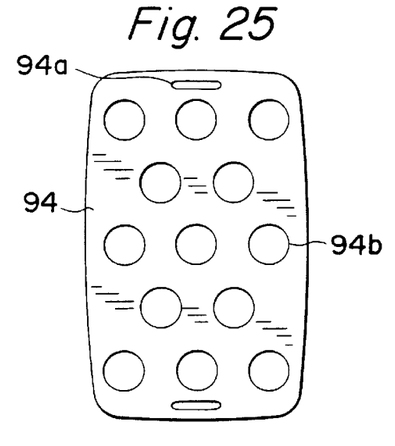
Figure 26:
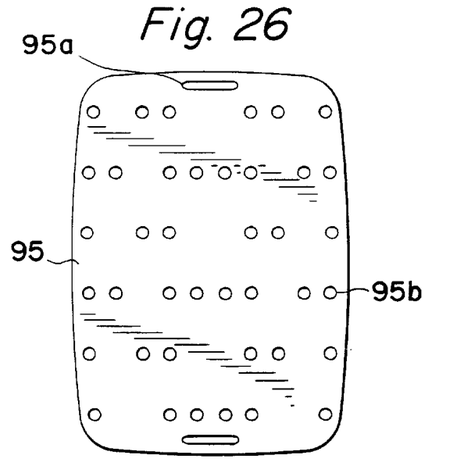

The known structure of nozzle 10 (FIGS. 1–3) is adapted for insertion into a shaped inlet opening of a Black and Decker device as shown in FIG. 20 and fully described in U.S. Pat. No. 4,209,875. Current models of this style vacuum cleaner have an inlet opening 87 that is shaped to receive the insert portion 14 of nozzle member 10. The disclosure of U.S. Pat. No. 4,209,875 is incorporated herein in its entirety by reference. The outer surface of the collection chamber housing of this device may be fitted with an outer collar or sleeve mechanism as shown in FIGS. 11 and 12. Collar member 36 is shaped to fit around the outer surface of housing member 46 as shown in FIG. 12. Collar member 36 may be composed of rigid material and have an inner surface designed and adapted to grip the housing outer surface when collar 36 is slipped in place over the distal end of housing 46. It is possible that collar device 36 may be composed of elastomeric resilient material that will frictionally grip the housing outer surface when disposed thereon.

In the embodiment of FIGS. 11 and 12, a generally U-shaped bracket member 38 has two opposed coupling end sections 37 adjustably fastened to collar member 36 with a fastening member 39 at each end of bracket 38. Slot 45 enables adjustment of the comb assembly with respect to housing member 46 when collar member 36 is secured to housing member 46. Intermediate comb carrying section 41 of bracket 38 includes holes 44 that may be aligned at each end thereof with apertures 43 in comb member 40 as shown. Fastening members such as pins or screws secure comb 40 in the desired vertical position with respect to bracket member 38 as shown. Comb 30 includes comb sections 42 and 44 located at opposed sides of comb member 40. The wider spaced teeth in comb section 44 accommodate thicker hair while the closer spaced teeth in comb section 42 are usable with thinner or finer hair on the outer coat of an animal. As shown in FIG. 12, the angle of the comb member 40 may be adjusted by loosening the hand-tightened fastening members 39 so that the desired combing angle may be set with respect to the inlet opening means of housing member 46.

Figure 13:
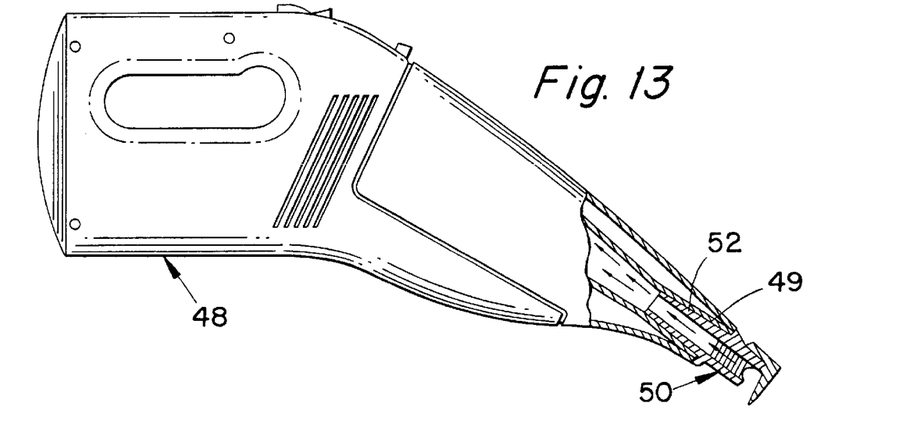
FIG. 13 is a side elevational view partly in cross-section of a hand-held vacuum cleaner showing a further embodiment of a comb nozzle attachment of the invention.
Figures 14, 15, 16, 17:
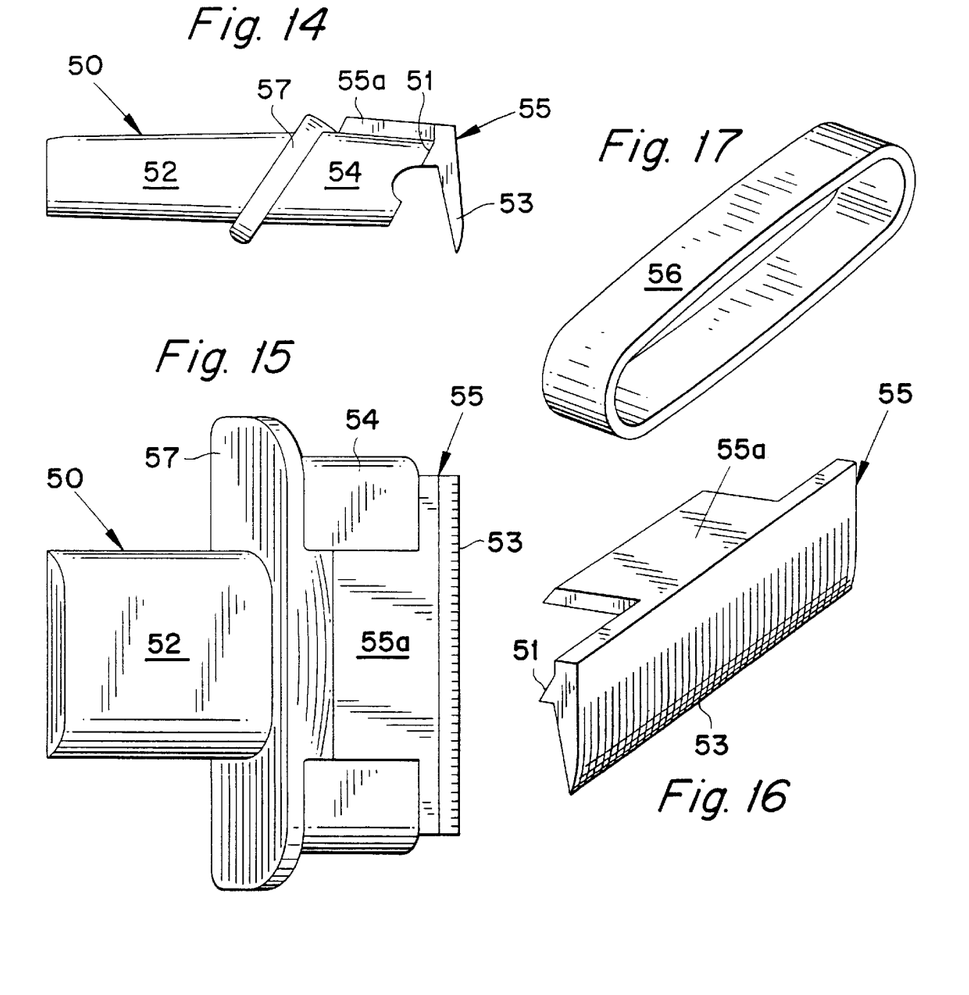
FIG. 14 is a side elevational view of the comb nozzle attachment of FIG. 13.
FIG. 15 is a top elevational view of the comb attachment and nozzle assembly shown in FIG. 14.
FIG. 16 is a perspective view of the comb attachment used within the nozzle assembly of FIGS. 14 and 15.
FIG. 17 is a perspective view of an annular elastomeric band used to removably secure the comb attachment of FIG. 16 to a nozzle assembly of FIG. 15.

Comb assemblies for retrofitting a hand-held vacuum cleaner are shown in FIGS. 13–17. U.S. Pat. Nos. 4,967,443 and 5,099,545 disclose a vacuum cleaner used in conjunction with this specific embodiment of the invention. And the disclosures of U.S. Pat. Nos. 4,967,443 and 5,099,545 are incorporated herein in their entirety by reference. Nozzle member 50 shown in FIG. 14 is disposed within inlet sleeve 49 of vacuum cleaner 48 as shown in FIG. 13. Nozzle attachment 50 includes nozzle insert portion 52, front section 54, and a flange portion 57 that separates insert portion 52 from outer end portion section 54. Insert portion 52 slidingly fits into inlet sleeve 49 to frictionally hold nozzle attachment 50 in place.

Comb assembly 55 (FIG. 16) includes tine portion 53 and mating sections 51 and 55a including a mating surface shaped to conform to outer surface portions of front section 54 as shown in FIGS. 14 and 15. In the embodiment as shown in FIGS. 13–15, the comb coupling means includes adhesive material that is disposed between the mating surface portion of mating sections 51 and 55a to fixedly secure comb member 55 to the nozzle member 50 as shown. Undercut surface portion of mating section 51 engages the upper front edge of nozzle front section 54 as shown. Adhesive applied between the mating surface completes a complementary mechanical structure with the adhering strength of the adhesive to fixedly and adequately maintain attachment of comb assembly to nozzle 50.

Instead of a fixed or permanent attachment of comb member 55 to nozzle member 50, an annular elastomeric band 56 (FIG. 17) may be resiliently stretched and disposed over mating section 55a and the outer surface of nozzle front section 54 once in place as shown in FIGS. 14 and 15. The annular band 56 without adhesive is sufficient to hold the surface mating surface 55a against the top surface of nozzle section 54. And the combination of the mechanical relationship between mating section 51 and band 56 is sufficient to hold comb assembly 55 in fixed aligned disposition with respect to the air inlet opening during use of nozzle member 50 with the vacuum cleaner converted to a flea disposal assembly.

The comb attachments as disclosed herein may be used in combination with different kinds of nozzle members that are presently available with known hand-held vacuum cleaners. The comb or tine portions of the various comb assemblies are designed so that fleas cannot slip between the tines and escape the pull of the vacuum created by available standard battery-powered vacuum cleaners. The adhesive may be any known material such as various types of epoxy resins used to firmly bond plastic materials. The flea disposal assembly of the invention is designed for use in combination with a vacuum producing device to kill fleas drawn into the housing member of the vacuum cleaner. It is possible to place insecticide such as flea powder or the like in a standard filter bag currently used with the hand-held vacuum cleaner. Various types of adhesive materials may be used to capture the fleas and hold them until they are destroyed. Yet the flea disposal assembly of this invention provides a unique flea disposal module for use in combination with known housing structures of hand-held vacuum cleaners.

A flea disposal module 60 of the invention has a structural configuration effective to fit in registered frictional alignment with the outlet opening of housing member 86 (FIG. 21) in place of the regular air filter assembly of vacuum cleaner 85. Module 60 is effective to entrap fleas separated from the outer skin of an animal with a comb means. The separated fleas are drawn into the air inlet sleeve 87 of housing 86 when suction providing means produces a current of air to flow into air inlet sleeve 87, through housing 86 and out of the air outlet opening of housing 86.

Module 60 (FIG. 18) includes a support base member 62 removably mounted to air producing means as shown in FIG. 20. Support base member 62 includes an opening 61 covered with an air pervious filter medium 64 that is effective to allow the current of air to flow through flea disposal module 60 while entrapping solid materials. As is evident in the drawings, an outer flange configuration of support base 62 constitutes connection means for removably securing flea disposal module 60 to the air producing means. Projecting support members 65 and 65a extend forwardly from support base 62 into the chamber formed by housing 86, which is attached to the air current producing means in a manner well known in the prior art. In this embodiment, three adhesive carrier elements 66, 68, and 70 include adhesive surface portions on both sides thereof and a plurality of apertures through which air current may flow. More specifically, carrier element 70 includes adhesive surface portion 72 and a nonadhesive outer edge portion 71 in which openings 71a are located for disposing element 70 onto projections 65 and 65a. Apertures 70c are larger than openings 68c in carrier element 68 and openings 68c are larger than openings 66c in carrier element 66 as shown. Edge openings 66a and 68a enable respective carrier elements 66 and 68 to be mounted to projections 65 and 65a. In this embodiment, carrier elements 66, 68, and 70 are removably disposed on projections 65 and 65a. The disposition of module 60 retrofitted to a hand-held vacuum cleaner is shown in FIGS. 20, 21 and 22.

Carrier elements 66, 68 and 70 are also known as baffles with fly paper or any other type of adhesive material attached to the front and back of each baffle. The nonadhesive outer edge of each baffle keeps module 60 from sticking to the inside of housing member 86. As described, the air flow directing holes 70c in carrier element or baffle 70 are the largest of the three carrier elements. Carrier element holes 68c are one-half the size of openings 70c. And apertures 66c are one-half the size of carrier element holes 68c. In addition, the holes are offset with respect to each other in adjacent baffles so that they are misaligned with each other thereby causing the flow of any air current to change direction when passing through housing 86. By changing the direction of air flow, fleas carried by the air current are misdirected and thrown against the adhesive surface portions of carrier elements 66, 68, and 70 to contact and stick to the adhesive materials on each carrier element. The shaped inner surface of housing 86 defines a flea disposal chamber section in which adhesive module 60 and carrier elements 66, 68, and 70 project. The outer profile of the carrier elements are shaped to substantially contiguously fit within the shaped inner surface of the flea disposal chamber section as shown in FIG. 21.

Figure 18:
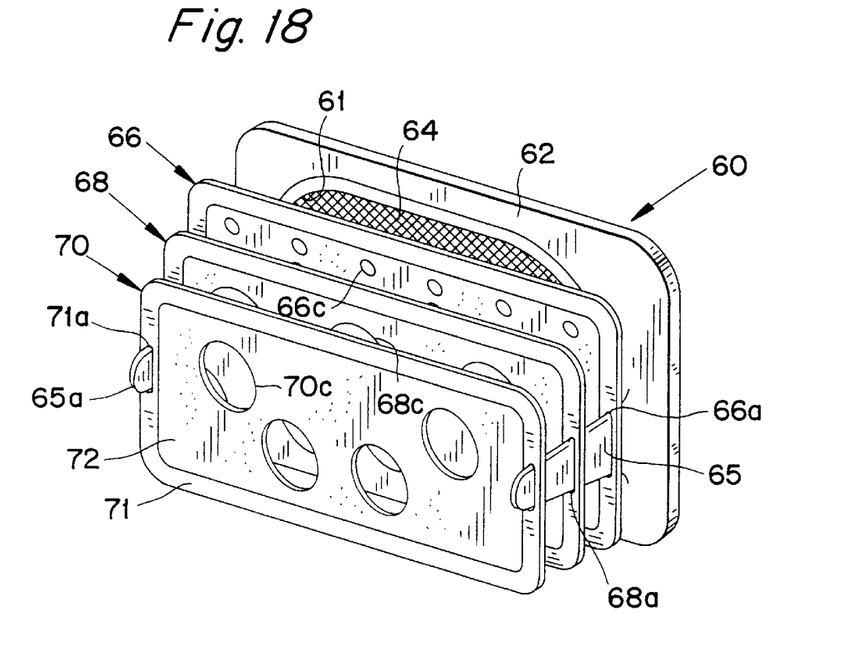
FIG. 18 is a perspective view of a flea disposal module of the invention.
Figure 19:
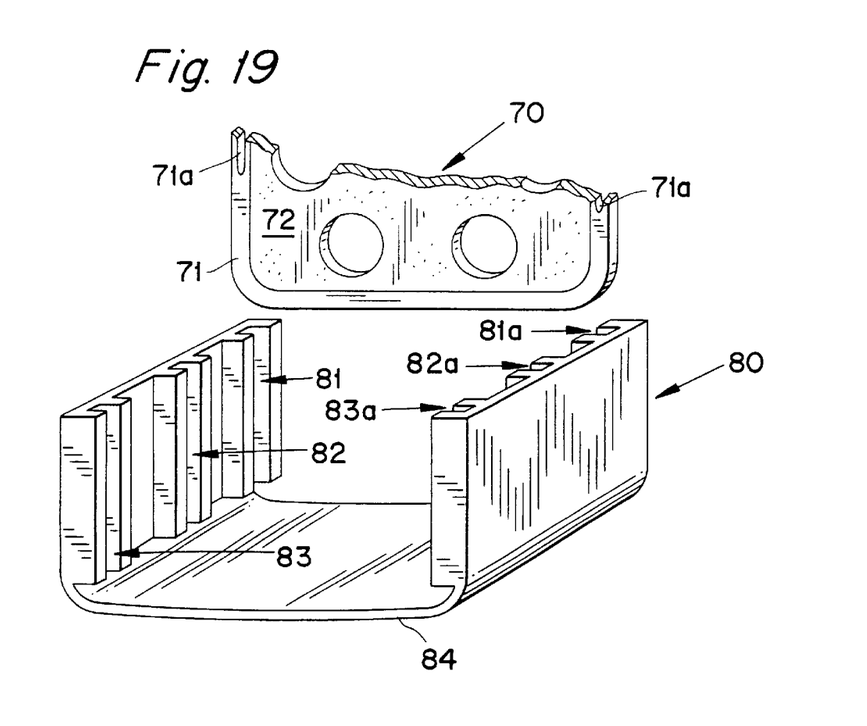
FIG. 19 is a perspective view of another embodiment of a flea disposal module of the invention.

Flea disposal module 80 (FIG. 19) has a U-shaped holding member 84 that includes three pairs of elongated slots 81, 81a; 82, 82a; and 83, 83a into which the outer edges of carrier elements 66, 68, and 70 may be disposed. Elongated slots 81, 81a; 82, 82a; and 83, 83a each receive respective carrier elements 66, 68, and 70 and may be placed as a unit with the three carrier elements being slipped over projections 65 and 65a as shown on base member 62 of FIG. 18. For clarity, only carrier element 70 is shown in FIG. 19 from a direction opposite to the direction in which module 60 of FIG. 18 is viewed.

The construction of a base member and opposed projections on the base member is a common configuration found in existing filter systems for known vacuum cleaner devices. With the embodiment shown in FIG. 19, it is possible to simply convert the existing filter assembly of a vacuum cleaner by removing the outer bag portion, putting the filter medium of the bag portion across the opening of the base member and then simply sliding the entire set of three filter elements as disposed in holding member 84 over the outwardly directed projections on the known filter assembly.

In another embodiment, flea disposal unit 90 (FIGS. 23–26) includes base member 91 having two opposing projections 92 with the three carrier elements or baffles 93, 94, and 95 with different widths as shown and aligned with respect to each other on projection 92 to fit within a housing chamber shaped differently from that shown in FIGS. 20, 21, and 22. Openings 93b, 94b, and 95b of the respective carrier elements 93, 94, and 95 are arranged slightly differently from the module embodiment shown in FIG. 18. With adhesive material found on the front and back of each baffle, the fleas are exposed to capture or entrapment on contact with the adhesive as they bounce onto or between the laterally spaced surfaces of baffle members 93, 94, and 95.

Figure 27:
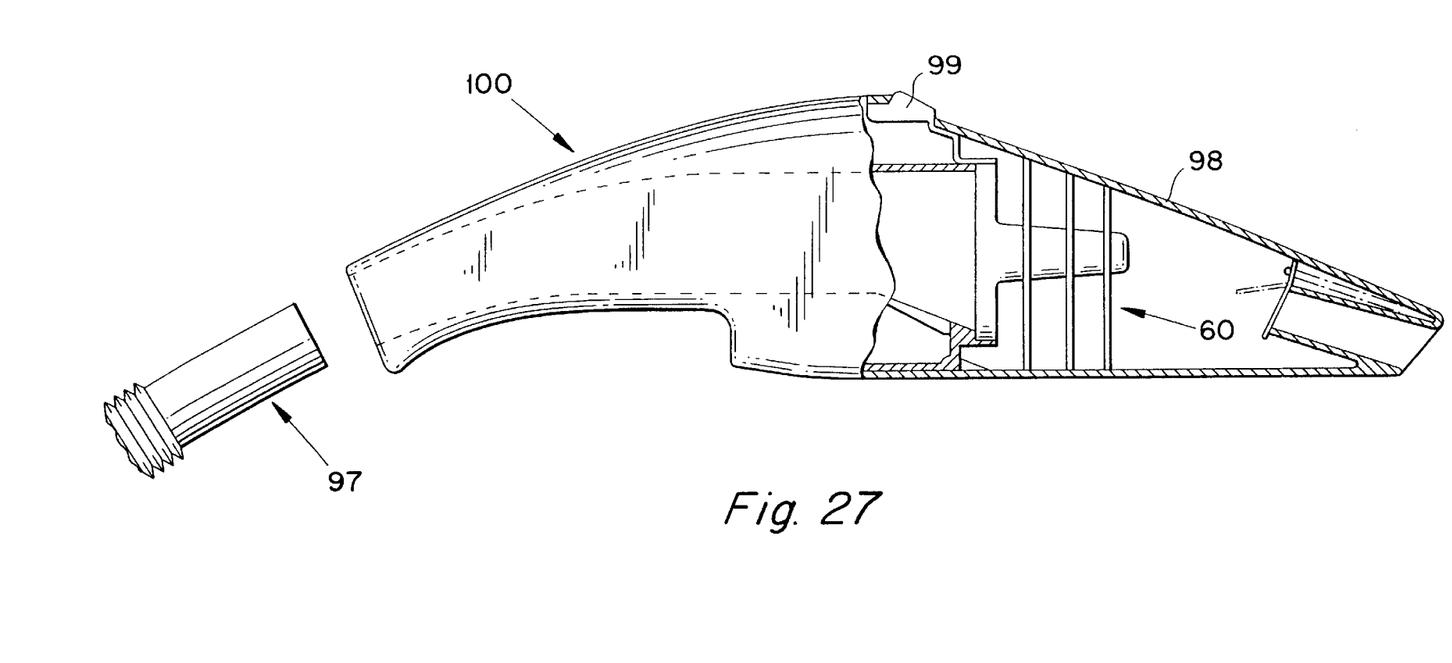
FIG. 27 is a side elevation view, of another embodiment of a device for attachment to a suction or vacuum source.

The embodiment of flea disposal assembly 100 shown in FIG. 27 is designed to attach to the end of a standard vacuum cleaner hose 97. The hand-held flea disposal assembly 100 includes a housing 98 that is connected to a hand grasping section using a connection mechanism 99 that is identical to that shown in the embodiment of FIGS. 20–22. The flea disposal module 60 of FIG. 18 is shown in the hand-held embodiment of FIG. 27 and attaches to a hub portion in the same fashion as in the FIG. 20 embodiment. Any one of the various comb mechanisms is to be used in combination with the hand-held flea disposal assembly 100 as described with respect to the FIG. 21 embodiment or with any other flea disposal module of the invention.

While the flea removal assembly and conversion kit has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. An assembly for removing fleas from the outer skin of animals while protecting an animal caretaker from becoming a host for separated fleas, said assembly comprising:

a) housing means defining material collection chamber means having air inlet means at one end thereof and air outlet means at the other end thereof, b) comb means externally disposed at said one end of the housing means adjacent the air inlet means for separating fleas from the outer skin of an animal, c) flea disposal means removably disposed within the housing means for entrapping separated fleas within said chamber means, d) said flea disposal means including support base means, air pervious means, and adhesive surface carrier means mounted to said support base means to adhesively capture said separated fleas upon contact within said housing means, e) air current producing means and connecting means for removably attaching said housing means to said air current producing means for causing an air current to flow into said material collection chamber means through the air inlet means and out of said air outlet means, f) said support base means being removably mounted to said air producing means and said air pervious means being effective to allow said current of air to flow through said flea disposal means.

2. An assembly as defined in claim 1 wherein said adhesive surface carrier means includes disposable adhesive surface portions removably mounted to said support base means.

3. An assembly as defined in claim 1 wherein said support base means includes connection means for removably securing the flea disposal means to said air producing means for projecting said adhesive surface carrier means into said chamber means when said housing means is attached to said air current producing means.

4. An assembly as defined in claim 3 wherein said adhesive surface carrier means includes a plurality of adhesive carrier elements each having adhesive surface portions and a plurality of apertures through which air current may flow, the apertures in each carrier element being misaligned with the apertures of the next adjacent carrier element to cause any air current to change direction when flowing through the housing means to cause fleas carried by the air current to be thrown against the adhesive carrier elements to contact the adhesive surface portions of the carrier elements.

5. An assembly as defined in claim 4 wherein said adhesive carrier elements are composed of disposable material, and said support base means is composed of disposable material and includes a base frame portion and projection means extending outwardly from said base frame portion to support said adhesive carrier elements.

6. An assembly as defined in claim 4 wherein said housing means has a shaped inner surface defining a flea disposal chamber section, said adhesive carrier elements include a nonadhesive peripheral edge section to preclude adherence of the adhesive surface carrier means to the shaped inner surface of the flea disposal chamber section.

7. An assembly as defined in claim 1 wherein said housing air outlet means includes a shaped air discharge opening, and said air pervious means includes air filter means to keep separated fleas and any other material removed from said outer skin of an animal within said material collection chamber means when directing said current of air through said housing means, and said support base means includes a base frame portion having an outer rim section shaped to frictionally fit to said shaped air discharge opening for directing said current of air to flow through said air filter means.

8. An assembly as defined in claim 7 wherein said housing means has a shaped inner surface defining a flea disposal chamber section of said material collection chamber means adjacent said shaped air discharge opening, and said adhesive surface carrier means includes a plurality of adhesive carrier elements mounted to said base frame portion and being laterally spaced with respect to each other, each adhesive carrier element having an outer profile shaped to substantially contiguously fit within said shaped inner surface of said flea disposal chamber section.

9. An assembly as defined in claim 8 wherein each of the adhesive carrier elements includes a plurality of apertures through which the current of air is directed to flow through said flea disposal chamber section when the flea disposal means is mounted within said housing means and a current of air is directed through said housing means, the apertures in each carrier element being offset with respect to the apertures in the next juxtaposed carrier element and being sized in each succeeding adhesive carrier element to increase the velocity of air flow as the air moves toward said air discharge opening.

10. An assembly as defined in claim 1 wherein said support base means includes projection means extending outwardly from a base frame portion, and said adhesive surface carrier means includes adhesive surface portions located on adhesive carrier elements supported by said projection means with the adhesive carrier element spaced furthest from the base frame portion having the largest apertures for air flow and each adhesive carrier element succeedingly closer to the base frame portion having smaller openings to successively increase the velocity of air flow passing through said flea disposal means.

11. An assembly as defined in claim 10 wherein the apertures in each said adhesive carrier elements are spaced with respect to each other with the adhesive surface portions located between the apertures to capture fleas misdirected and separated from said air current.

12. An assembly as defined in claim 1 wherein said comb means includes a comb member having a plurality of tines and comb coupling means mounting the comb member to adjust an angle of disposition of the comb member with respect to the air inlet means of said housing means.

13. An assembly as defined in claim 12 wherein said comb coupling means includes a generally U-shaped bracket member having two opposed coupling end sections adjustably fastened to said housing means and an intermediate comb member carrying section with attachment means for adjusting said comb member with respect to the air inlet means.

14. A retrofit kit combination for converting a hand-held vacuum cleaner into a flea removal assembly wherein the vacuum cleaner includes a material collection housing member removably attached to hand-held suction providing means wherein the housing member has air inlet means at an outer distal end thereof, air outlet means at an inner end thereof, and air filter means disposed within the air outlet means to allow an air current to flow through the housing member while collecting material carried by the air current within the housing member, and said air inlet means includes receiving means for removably mating with an insertion portion of a nozzle member, said kit combination comprising:

a) a nozzle member including an air inlet opening at a distal end thereof and an insertion portion having a structural configuration to removably fit into said air inlet receiving means, and b) flea separating comb means including a tine portion and mating surface portion shaped to conform to and mate with an outer surface portion of said nozzle member, c) said comb means including mounting means for fixing said tine portion adjacent said air inlet opening so that said tine portion is fixedly located at an angular disposition to and in registered alignment with said air inlet opening of the nozzle member.

15. A kit combination as defined in claim 14 further including a flea disposal module having a structural configuration effective to fit in registered alignment with the outlet means of the housing member in place of the air filter means of the vacuum cleaner, said flea disposal module being effective to entrap fleas separated from the outer skin of an animal with said comb means and carried into said air inlet means of the housing member when the suction providing means produces a current of air to flow into the air inlet means, through the housing member, and out of said air outlet means.

16. A kit combination as defined in claim 15 wherein said flea disposal module includes connecting means for securing said flea disposal module to said suction providing means in exchange for said air filter means of said vacuum cleaner.

17. A kit combination as defined in claim 15 wherein said flea disposal module includes baffle means disposed on base frame means to form an entrapment zone adjacent said air outlet means within said material collection housing member.

18. A kit combination as defined in claim 14 wherein the air inlet means of said vacuum cleaner includes receiving means for frictionally mating with said insertion portion of said nozzle member being effective to slidingly fit into said air inlet receiving means.

19. A kit combination as defined in claim 18 wherein said comb means includes a comb member that incorporates said mating surface means shaped to conform to said outer surface portion of said nozzle member, and said comb coupling means includes adhesive means disposed between said mating surface means and said outer surface portion of said nozzle member for fixedly securing said comb means to said nozzle member.

20. A kit combination as defined in claim 18 wherein said comb coupling means includes elastomeric annular band means for removably maintaining said tine portion in said fixed location and in alignment with said air inlet opening of the nozzle member during use of the vacuum cleaner as a flea disposal assembly, said annular band means being removably disposed on said nozzle member and being effective to urge said mating surface portion against said outer surface portion of said nozzle member.

21. A kit combination as defined in claim 18 wherein
said outer surface portion of the nozzle member includes a flange section located at an outer end of said insertion portion and disposed adjacent said air inlet opening, and
said comb coupling means includes grasping means for gripping said flange section of said nozzle member.

22. A kit combination as defined in claim 18 wherein
said comb coupling means and said insertion portion are integrally molded as a one-piece configuration.

23. A retrofit kit combination for converting a hand-held vacuum cleaner into a flea removal assembly wherein the vacuum cleaner includes a material collection housing member removably attached to hand-held suction providing means wherein the housing member has air inlet means at an outer distal end thereof, air outlet means at an inner end thereof, and air filter means disposed within the air outlet means to allow an air current to flow through the housing member while collecting material carried by the air current within the housing member, said kit combination comprising:
   a) comb means having a structural configuration effective to fit in registered alignment with the air inlet means of said vacuum cleaner for separating fleas from the outer skin of an animal,
   b) comb coupling means for securing the flea separating comb means to the outer distal end of said housing member adjacent said air inlet means, and
   c) a flea disposal module having a structural configuration effective to fit in registered alignment with the outlet means of the housing member in place of the air filter means of the vacuum cleaner,
   d) said flea disposal module being effective to entrap fleas separated from the outer skin of an animal with said comb means and carried into said air inlet means of the housing member when the suction providing means produces a current of air to flow into the air inlet means, through the housing member, and out of said air outlet means,
   e) said flea disposal module includes connecting means for securing said flea disposal module to said suction providing means in exchange for said air filter means of said vacuum cleaner, and baffle means disposed on base frame means to form an entrapment zone adjacent said air outlet means within said material collection housing member,
   f) said baffle means including air current flow control means for increasing the velocity of air as a current of air flows through said baffle means, and
   g) said baffle means including adhesive surface portions to entrap said separated fleas upon contact.

24. A retrofit kit combination for converting a hand-held vacuum cleaner into a flea removal assembly wherein the vacuum cleaner includes a material collection housing member removably attached to hand-held suction providing means wherein the housing member has air inlet means at an outer distal end thereof, air outlet means at an inner end thereof, and air filter means disposed within the air outlet means to allow an air current to flow through the housing member while collecting material carried by the air current within the housing member, said kit combination comprising:
   a) flea separating comb means mounted to collar means and including a tine portion,
   b) said comb means having a structural configuration effective to fix said tine portion in registered alignment with the air inlet means of said vacuum cleaner for separating fleas from the outer skin of an animal,
   c) said collar means having a structural configuration effective for disposition over an outer distal end surface portion of the housing member to secure said flea separating comb means to said housing member and to dispose said tine portion adjacent to and in registered alignment with said air inlet means.

* * * * *

UNITED STATES PATENT AND TRADEMARK OFFICE
CERTIFICATE OF CORRECTION

PATENT NO. : 5,870,851

DATED : February 16, 1999

INVENTOR(S) : David G. Shoemaker

It is certified that error appears in the above-identified patent and that said Letters Patent is hereby corrected as shown below:

Column 7, line 41, change "line A--A" to --line 21--21--.

Signed and Sealed this

Eighteenth Day of May, 1999

Q. TODD DICKINSON

*Attest:*

*Attesting Officer*     *Acting Commissioner of Patents and Trademarks*